(12) United States Patent
Moteki et al.

(10) Patent No.: US 10,411,308 B2
(45) Date of Patent: Sep. 10, 2019

(54) POWER SUPPLY CONTROL SYSTEM AND POWER SUPPLY CONTROL METHOD

(71) Applicant: HONDA MOTOR CO., LTD., Minato-ku, Tokyo (JP)

(72) Inventors: Norio Moteki, Utsunomiya (JP); Yukikazu Fukumoto, Utsunomiya (JP); Yasuhiro Ikeda, Shimotsuke (JP); Masaya Agata, Sakura (JP)

(73) Assignee: HONDA MOTOR CO., LTD., Tokyo (JP)

( * ) Notice: Subject to any disclaimer, the term of this patent is extended or adjusted under 35 U.S.C. 154(b) by 91 days.

(21) Appl. No.: 15/844,819

(22) Filed: Dec. 18, 2017

(65) Prior Publication Data

US 2018/0183113 A1   Jun. 28, 2018

(30) Foreign Application Priority Data

Dec. 28, 2016  (JP) ................. 2016-256142

(51) Int. Cl.
| | |
|---|---|
| *H01M 10/48* | (2006.01) |
| *H02M 3/156* | (2006.01) |
| *B60R 16/033* | (2006.01) |
| *F02N 11/08* | (2006.01) |
| *H02J 7/14* | (2006.01) |
| *H02J 7/00* | (2006.01) |
| *H02J 7/16* | (2006.01) |

(Continued)

(52) U.S. Cl.
CPC .......... *H01M 10/48* (2013.01); *B60R 16/033* (2013.01); *F02N 11/08* (2013.01); *H01M 16/00* (2013.01); *H02J 7/007* (2013.01); *H02J 7/1423* (2013.01); *H02J 7/1446* (2013.01); *H02J 7/16* (2013.01); *H02M 3/156* (2013.01); *H02P 9/48* (2013.01); *Y02T 10/92* (2013.01)

(58) Field of Classification Search
CPC ..... H01M 10/48; H01M 16/00; B60R 16/033; F02N 11/08; H02J 7/007; H02J 7/1446; H02J 7/1423; H02J 7/16; H02M 3/156; H02P 9/48; Y02T 10/92
See application file for complete search history.

(56) References Cited

U.S. PATENT DOCUMENTS

2005/0269880 A1   12/2005   Konishi

FOREIGN PATENT DOCUMENTS

| JP | 63-129900 | 6/1988 |
|---|---|---|
| JP | 2004-129341 | 4/2004 |
| JP | 2005-354759 | 12/2005 |

(Continued)

OTHER PUBLICATIONS

Japanese Notice of Allowance for Japanese Patent Application No. 2016-256142 dated Feb. 26, 2019.

(Continued)

*Primary Examiner* — Robert L Deberadinis
(74) *Attorney, Agent, or Firm* — Amin, Turocy & Watson LLP

(57) ABSTRACT

A power supply control system includes a power generator, a power supply configured to be charged with power supplied by the power generator, an electrical load configured to operate according to the power supplied by the power generator, and a control unit configured to charge the power supply until a predetermined period elapses after switching from an operation state in which the electrical load is operated to a non-operation state when the power generator generates the power.

15 Claims, 5 Drawing Sheets

(51) Int. Cl.
*H01M 16/00* (2006.01)
*H02P 9/48* (2006.01)

(56) References Cited

FOREIGN PATENT DOCUMENTS

| | | |
|---|---|---|
| JP | 2015-009790 | 1/2015 |
| JP | 2015-009791 | 1/2015 |
| JP | 2015-009792 | 1/2015 |

OTHER PUBLICATIONS

Japanese Office Action for Japanese Patent Application No. 2016-256142 dated Jul. 17, 2018.

POWER SUPPLY CONTROL SYSTEM AND POWER SUPPLY CONTROL METHOD

CROSS-REFERENCE TO RELATED APPLICATION

Priority is claimed on Japanese Patent Application No. 2016-256142, filed Dec. 28, 2016, the content of which is incorporated herein by reference.

BACKGROUND OF THE INVENTION

Field of the Invention

The present invention relates to a power supply control system and a power supply control method.

Description of Related Art

When a total amount of electrical load of a power generator quickly decreases when the power generator is generating electric power by a driving force of an internal combustion engine, a rotational speed of the internal combustion engine may quickly increase. On the other hand, a technology is known for preventing a rapid increase in the rotational speed of an internal combustion engine by performing adjustment so that the total amount of an electrical load gradually decreases even if switching from a state in which power is supplied from a power generator to an electrical load to a state in which the electrical load is cut off from the power generator is performed (see, for example, Japanese Unexamined Patent Application, First Publication No. S63-129900 (hereinafter referred to as Patent Literature 1)).

SUMMARY OF THE INVENTION

However, according to Patent Literature 1, even in a situation in which it is desirable to stop the supply of power to the electrical load, a timing at which the supply thereof is interrupted may be excessively delayed. Thus, energy is ineffectively consumed when an operation is performed in a state in which the supply should be interrupted and energy efficiency is lowered.

An aspect according to the present invention has been made in view of such circumstances, and an objective thereof is to provide a power supply control system and a power supply control method capable of further improving energy efficiency.

To solve the above-described problem, the present invention adopts the following aspects.

(1) According to an aspect of the present invention, a power supply control system is provided, including: a power generator; a power supply configured to be charged with power supplied by the power generator; an electrical load configured to be operated with the power supplied by the power generator; and a control unit configured to charge the power supply until a predetermined period elapses after switching from an operation state in which the electrical load is operated to a non-operation state when the power generator generates the power.

(2) In the aspect (1), the control unit may charge the power supply before the switching from the operation state in which the electrical load is operated to the non-operation state when the power generator generates the power.

(3) In the aspect (2), the control unit may charge the power supply to a predetermined target value related to a state of the power supply, continuously charge the power supply with the power supplied by the power generator even in the switching from the operation state in which the electrical load is operated to the non-operation state when the power generator generates the power, and use a second value less than a first value used before the electrical load is brought into the non-operation state as the target value after the predetermined period has elapsed from the non-operation state of the electrical load.

(4) In any one of the aspects (1) to (3), a plurality of power supplies each having different charging/discharging responsiveness may be included as the power supply, and the control unit may charge a power supply having higher charging/discharging responsiveness among the plurality of power supplies until a predetermined period elapses after the switching from the operation state in which the electrical load is operated to the non-operation state when the power generator generates the power.

(5) In the aspect (4), the control unit may charge the power supply having the higher charging/discharging responsiveness among the plurality of power supplies from before the switching from the operation state in which the electrical load is operated to the non-operation state when the power generator generates the power.

(6) In the aspect (5), the control unit may charge the power supply to a predetermined target value related to a state of the power supply, continuously charge the power supply having the higher charging/discharging responsiveness among the plurality of power supplies with the power supplied by the power generator even in the switching from the operation state in which the electrical load is operated to the non-operation state when the power generator generates the power, and use a second value less than a first value used before the electrical load is brought into the non-operation state as the target value related to charging of the power supply having the higher charging/discharging responsiveness among the plurality of power supplies after the predetermined period has elapsed from the non-operation state of the electrical load.

(7) In the aspect (3) or (6), the control unit may perform charging by maintaining the first value as the target value for a predetermined time or more even after switching to the non-operation state.

(8) In the aspect (3) or (6), the control unit may decrease the target value from the first value to the second value across the predetermined period after switching to the non-operation state.

(9) In any one of the aspects (3) to (7), the first value may be less than a value indicating a state in which the power supply is fully charged.

(10) In any one of the aspects (1) to (9), the control unit may complete charging of the power supply after the predetermined period has elapsed.

(11) In any one of the aspects (1) to (10), the control unit may complete the charging after the predetermined period has elapsed regardless of whether or not the power supply has reached a fully charged state.

(12) In any one of the aspects (1) to (11), the control unit may charge the power supply until the predetermined time elapses after switching from the operation state in which the electrical load is operated to the non-operation state in a state in which a driving state of a driving unit configured to drive the power generator is idling.

(13) In any one of the aspects (1) to (12), the power supply may have higher charging/discharging responsiveness than a lead storage battery.

(14) In any one of the aspects (1), (3), (4), (6), (8), and (10) to (12), the predetermined period may be a period during which an electrical current for charging the power supply is less than a predetermined value.

(15) According to an aspect of the present invention, a power supply control method is provided in a power supply control system including a power generator, a power supply configured to be charged with power supplied by the power generator, and an electrical load configured to be operated with the power supplied by the power generator, the power supply control method including: charging the power supply until a predetermined period elapses after switching from an operation state in which the electrical load is operated to a non-operation state when the power generator generates the power.

According an aspect of the present invention, a power generator, a power supply configured to be charged with power supplied by the power generator, and an electrical load configured to be operated with the power supplied by the power generator are provided and the power supply is charged until a predetermined period elapses after switching from an operation state in which the electrical load is operated to a non-operation state when the power generator generates the power. Thereby, it is possible to provide a power supply control system and a power supply control method capable of preventing a quick increase in a rotational speed of an internal combustion engine and further improving energy efficiency.

DETAILED DESCRIPTION OF THE INVENTION

Hereinafter, embodiments of a power supply control system and a power supply control method of the present invention will be described with reference to the drawings.

Present Embodiment

Figure 1:
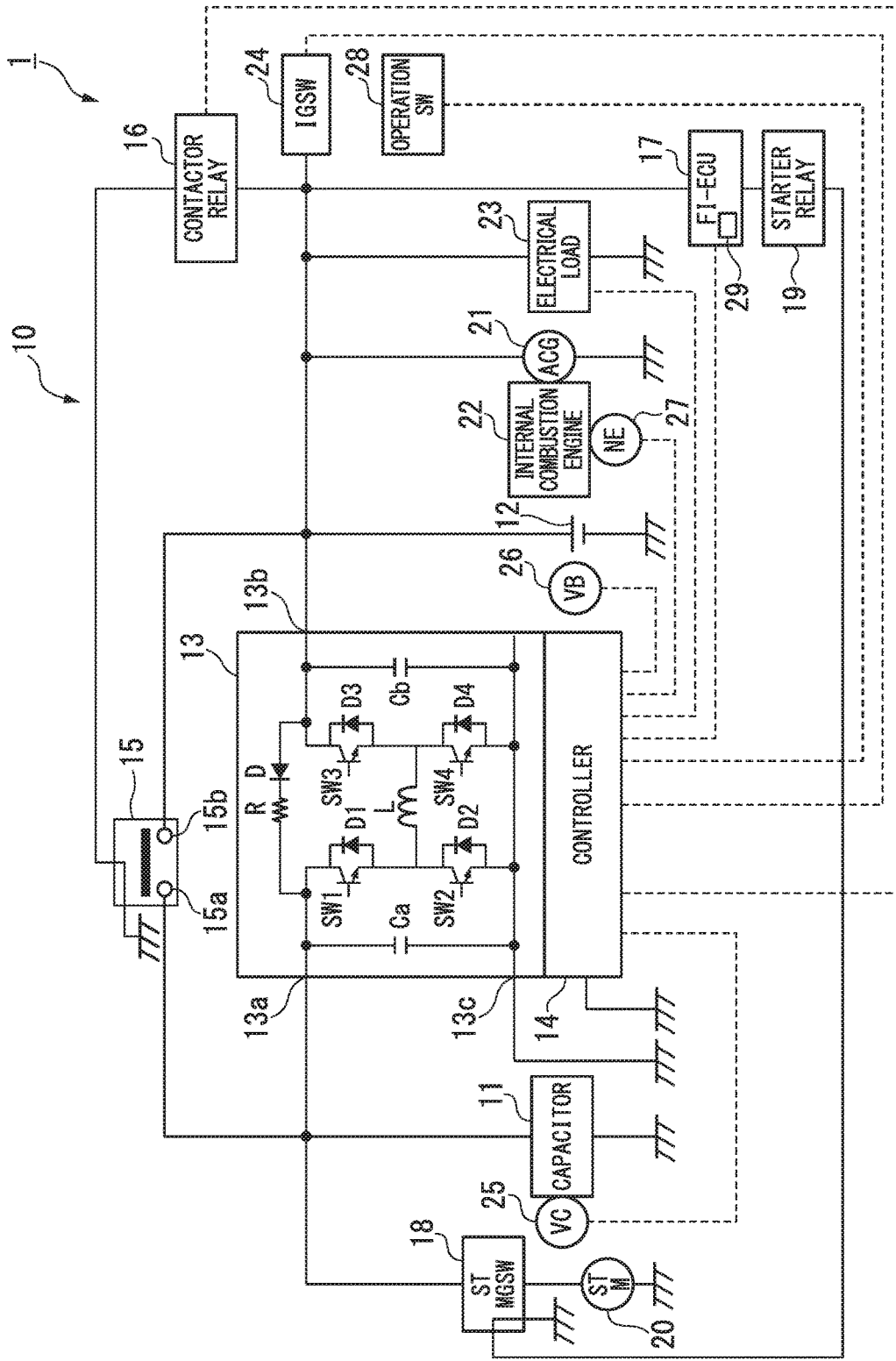
FIG. 1 is a diagram illustrating a configuration of a power supply control system according to an embodiment of the present invention.

FIG. 1 is a diagram illustrating a configuration of the power supply control system according to the present embodiment.

A vehicle power supply device 10 according to the present embodiment is a device mounted on a vehicle 1. The vehicle power supply device 10 is an example of the power supply control system.

The vehicle power supply device 10 includes at least a capacitor 11 and a battery 12, a direct current (DC)-DC converter 13, a controller 14, a contactor 15, and a contactor relay 16.

In addition to the vehicle power supply device 10, the vehicle 1 includes a fuel injection (FI)-electronic control unit (ECU) 17, a starter magnet switch (STMGSW) 18, a starter relay 19, a starter motor (STM) 20, a power generator (ACG) 21, an internal combustion engine 22, an electrical load 23, an ignition switch (IGSW) 24, a second voltage sensor 25 and a first voltage sensor 26, a rotational speed sensor 27, and an operation switch 28 (an operation SW).

The capacitor 11 (a second power supply) is, for example, an electric double layer capacitor or an electrolytic capacitor, a lithium ion capacitor, or the like. The capacitor 11 is connected to the starter magnet switch 18. Also, the capacitor 11 is connected to a first input/output terminal 13a of the DC-DC converter 13 and a first terminal 15a of the contactor 15. The capacitor 11 can be electrically connected to the battery 12, the contactor relay 16, the FI-ECU 17, the power generator 21, the electrical load 23, and the ignition switch 24 via the DC-DC converter 13 or the contactor 15. Also, the capacitor 11 has higher charging/discharging responsiveness than the battery 12, which is a lead storage battery.

The battery 12 (a first power supply) is, for example, a secondary battery such as a lead battery. The rated voltage of the battery 12 is, for example, 12 [V]. The battery 12 is connected to the contactor relay 16, the FI-ECU 17, the power generator 21, the electrical load 23, and the ignition switch 24. Also, the battery 12 is connected to a second input/output terminal 13b of the DC-DC converter 13 and a second terminal 15b of the contactor 15. The battery 12 can be electrically connected to the capacitor 11 and the starter magnet switch 18 via the DC-DC converter 13 or the contactor 15. In terms of charging/discharging performance per unit time, the charging/discharging performance of the battery (the first power supply) is lower than that of the capacitor 11.

That is, the capacitor 11 and the battery 12 are different from each other in terms of charging/discharging responsiveness. These power supplies include those that supply power to the electrical load 23. During power generation by the power generator 21, the capacitor 11 and the battery 12 may be charged with power obtained by the power generation until a predetermined time elapses after switching from an operation state in which the electrical load 23 is operated to a non-operation state. Also, it is preferable to use the capacitor 11 or the battery 12 having relatively high charging/discharging responsiveness as the power supply to be charged with the power obtained by the power generation. For example, if the battery 12 is a lead battery, the capacitor 11 may be selected as the target. The capacitor 11 and the battery 12 are examples of a plurality of power supplies, and a type of power supply, the number of power supplies, a combination of types thereof, and the like are not limited thereto, and other types of power supplies, the number of other power supplies, and a combination of other types of power supplies may be selected.

The DC-DC converter 13 can step up/down power bi-directionally between the first and second input/output terminals 13a and 13b under the control of the controller 14. The DC-DC converter 13 steps up power generated by the power generator 21 during an operation of the internal combustion engine 22 or regenerative power generated by the power generator 21 at the time of braking of the vehicle 1 as necessary, and supplies the power to the capacitor 11, thereby causing the capacitor 11 to be charged. Also, the DC-DC converter 13 steps up the power stored in the capacitor 11 as necessary, and supplies the power to at least the battery 12 or the electrical toad 23, thereby causing the capacitor 11 to be discharged.

The DC-DC converter 13 is, for example, an H-bridge step-up/step-down DC-DC converter, and includes four bridge-connected first to fourth switching elements (for example, insulated gate bipolar transistors (IGBTs) SW1, SW2, SW3, and SW4.

A pair of the first and second switching elements SW1 and SW2 in the DC-DC converter 13 are connected in series between the first input/output terminal 13a and a ground terminal 13c. That is, a collector of the first switching element SW1 is connected to the first input/output terminal 13a, an emitter of the first switching element SW1 is connected to a collector of the second switching element SW2, and an emitter of the second switching element SW2 is connected to the ground terminal 13c.

The third and fourth switching elements SW3 and. SW4 forming a pair in the DC-DC converter 13 are connected in series between the second input/output terminal 13b and the ground terminal 13c. That is, a collector of the third switching element SW3 is connected to the second input/output terminal 13b, an emitter of the third switching element SW3 is connected to a collector of the fourth switching element SW4, and an emitter of the fourth switching element SW4 is connected to the ground terminal 13c.

The first to fourth diodes D1 to D4 are connected between the emitters and the collectors of the switching elements SW1, SW2, SW3 and SW4 in a forward direction from the emitter to the collector.

The DC-DC converter 13 includes a reactor L connected between a connection point of the first switching element SW1 and the second switching clement SW2 and a connection point of the third switching element SW3 and the fourth switching element SW4. Further, a first capacitor Ca connected between the first input/output terminal 13a and the ground terminal 13c and a second capacitor Cb connected between the second input/output terminal 13b and the ground terminal 13c are provided.

The DC-DC converter 13 includes a resistor R and a diode D connected in series so that the DC-DC converter 13 is connected between the first input/output terminal 13a and the second input/output terminal 13b in series. The diode D is arranged in a forward direction from the second input/output terminal 13b to the first input/output terminal 13a.

The DC-DC converter 13 is driven by signals output from the controller 14 and input to the gates of the switching elements SW1, SW2, SW3, and SW4.

For example, the controller 14 (a control unit) is constituted of a processor such as a central processing unit (CPU), a large-scale integration (LSI), an application-specific integrated circuit (ASIC), a field-programmable gate array (FPGA), or the like. The controller 14 controls a bidirectional step-up/step-down operation of the DC-DC converter 13 and an operation of connecting and disconnecting the contactor 15 by the contactor relay 16. Further, the controller 14 determines whether to permit or prohibit execution of an idle stop by the FI-ECU 17 and outputs control command based on the determined details to the FI-ECU 17.

The controller 14 is connected to a second voltage sensor 25 for detecting an output voltage VC of the capacitor 1, a current sensor (not illustrated) for detecting a charging current and a discharging current of the capacitor 11, and a temperature sensor (not illustrated) for detecting the temperature of the capacitor 11.

The controller 14 controls discharging of the battery 12 and a discharging depth of the battery 12.

The controller 14 is connected to a first voltage sensor 26 for detecting an output voltage VB of the battery 12, a current sensor (not illustrated) for detecting a charging current and a discharging current of the battery 12, and a temperature sensor (not illustrated) for detecting a temperature of the battery 12.

The contactor 15 switches between connection and disconnection between the first and second terminals 15a and 15b of the contactor 15 in accordance with ON and OFF of the contactor relay 16. ON/OFF of the contactor relay 16 is controlled by the controller 14.

Also, the first terminal 15a of the contactor 15 is connected to the first input/output terminal 13a of the DC-DC converter 13, a positive terminal of the capacitor 11, and the starter magnet switch 18. The second terminal 15b of the contactor 15 is connected to the second input/output terminal 13b of the DC-DC converter 13, a positive terminal of the battery 12, the power generator 21 anal the electrical load 23. Thereby, in the connected state, the contactor 15 connects the capacitor 11 and the battery 12 in parallel to the starter magnet switch 18 and the starter motor 20 connected in series.

Also, negative terminals of the capacitor 11 and the battery 12 are grounded.

For example, the FI-ECU 17 has a configuration in which a program memory, a working memory, a communication interface, and the like are connected to a processor such as a CPU through a bus. The FI-ECU 17 performs various types of control related to the operation of the internal combustion engine 22 such as fuel supply and an ignition timing. The FI-ECU 17 controls starting and stopping of the internal combustion engine 22 according to signals of a start request and a stop request output from the ignition switch 24 in accordance with an operation of the occupant.

The FI-ECU 17 includes a time measurement unit 29. The time measurement unit 29 measures the time for controlling an operation state of each part. The FI-ECU 17 adjusts the execution of various processes on the basis of a result of a comparison between the measurement result from the time measurement unit 29, a predetermined threshold value, and the like.

The FI-ECU 17 performs idle stop control of the internal combustion engine 22. The idle stop control is control for automatically temporarily stopping the internal combustion engine 22 in an operation state in accordance with establishment of a predetermined temporary stop condition and automatically restarting the internal combustion engine 22 in a temporarily stopped state in accordance with establishment of a predetermined return condition. A predetermined temporary stop condition is, for example, that a vehicle speed of the vehicle 1 is zero, an accelerator pedal opening degree is zero, and a brake pedal switch is turned on. A predetermined return condition is, for example, that the brake pedal switch is turned off.

The FI-ECU 17 starts the internal combustion engine 22 by controlling the starter relay 19 so that the starter relay 19 is turned on in accordance with a start request based on a signal output from the ignition switch 24 or a request for return from the temporarily stopped state of the idle stop. Also, the FI-ECU 17 controls a power generation operation of the power generator (ACG) 21 and arbitrarily changes the generated voltage of the power generator 21.

The power generator 21 is an alternating current (AC) power generator connected to a crankshaft (not illustrated) of the internal combustion engine 22 via, for example, a belt. The power generator 21 generates AC power by using power during operation of the internal combustion engine 22 or power regenerated during deceleration of the vehicle 1. Also, the power generator 21 includes a rectifier (not illustrated) or the like for rectifying an AC output by power generation and regeneration to direct current output. The power generator 21 is connected to the second input/output terminal 13b of the DC-DC converter 13.

The internal combustion engine 22 (a power source or an engine) is started by a driving force of the starter motor (STM) 20. The starter motor 20 is rotationally driven by voltage application from the capacitor the battery 12 via the starter magnet switch (STMGSW) 18. The starter magnet switch 18 switches between the presence and absence of power to be fed to the starter motor 20 in accordance with ON and OFF of the starter relay 19. That is, the starter magnet switch 18 (the starting switch) connects and disconnects the starter motor 20 (the starting device), the capacitor 11 (the second power supply), and the battery 12 (the first power supply). ON and OFF of the starter relay 19 are controlled by the FI-ECU 17.

The starter motor 20 (the starting device), for example, is provided with a pinion gear (not illustrated) on a rotating shaft (not illustrated). In the internal combustion engine 22, for example, a crankshaft (not illustrated) is provided with a ring gear (not illustrated) engaging with the pinion gear of the starter motor 20. Thereby, the starter motor 20 can transfer the driving three to the internal combustion engine 22 by causing the pinion gear to engage with the ring gear on the internal combustion engine 22 side.

The electrical load 23 includes various auxiliary machines and the like mounted on the vehicle 1. The electrical load 23 is grounded and connected to the second input/output terminal 13b of the DC-DC converter 13.

The vehicle power supply device 10 according to the present embodiment has the above-described configuration. Next, the operation of the vehicle power supply device 10 will be described.

[Charging/Discharging Operation]

Charging/discharging operations of the capacitor 11 and the battery 12 controlled by the controller 14 will be described below.

The controller 14 controls the bidirectional step-up/step-down operation of the DC-DC converter 13 and the connection and the disconnection of the contactor 15 by the contactor relay 16 so that the output voltage of the capacitor 11 coincides with a predetermined target voltage according to the operation state of the vehicle 1.

The controller 14 executes nine operation modes M0 to M5 and the like as charging and discharging operations of the capacitor 11 and the battery 12 according to the operation of the vehicle 1.

For example, the operation modes M0 to M8 are determined as follows. There are "stop charging (M0)" for charging the capacitor 11 or the battery 12 when the vehicle is stopped, "initial activation (M1)" for performing activation according to discharging from the battery 12 in conjunction with the operation of the ignition switch or the starter switch, "I/S preparation charging (M2)" for charging the capacitor 11 prepared for idle stop, "regenerative charging (M3)" for charging the capacitor 11 during regeneration, "regenerative discharging (M4)" for discharging the capacitor II or the battery 12 with regenerative power and pausing the power generator 21 (ACG), "I/S capacitor power feeding (M5)" for performing discharging from the capacitor 11 to the electrical load at the time of idle stop, "I/S battery power feeding (M6)" for supplying power with which the battery 12 is discharged to the electrical load 23, "ENG restarting (M7)" for restarting the internal combustion engine 22 by discharging the capacitor 11, "charging during stop (M8)" for charging the capacitor 11 to minimize deterioration of the capacitor 11, and the like. In addition to the above-described nine operation modes M0 to M8, there is a "load power feeding mode (M9)" without charging and discharging operations of the capacitor 11 and the battery 12, In the "load power feeding mode (M9)," the capacitor 11 and/or the battery 12 are set to a non-charging state.

In each of the above-described operation modes, the mode in Which the power generator 21 is in the power generation state is a mode such as "I/S preparation charging (M2)," "regenerative charging (M3)," or "load power feeding mode (M9)."

For example, during "I/S preparatory charging (M2)," the DC-DC converter 13 converts power stored in the battery 12 into a desired voltage to charge the capacitor 11. During "regenerative charging (M3)," the DC-DC converter 13 converts the power generated by the power generator 21 to a desired voltage to charge the capacitor 11. During "load power feeding mode (M9)," the DC-DC converter 13 stops the power conversion and supplies the power generated by the power generator 21 to the electrical load 23.

The capacitor 11 or the like is charged with power generated by the power generator 21 in "I/S preparatory charging (M2)" and "regenerative charging (M3)" among the above-described three modes and a state in which power obtained by the power generation is supplied to the electrical load 23 may be included. Even if the power supply to the electrical load 23 is suddenly stopped in a state controlled by these modes, the capacitor 11 is continuously charged.

Also, the state in which power is supplied to the electrical load 23 is switched. independently of all the above-described modes. For example, the operation of the operation switch 28 of the occupant is a factor for switching the state in which power is fed to the electrical load 23. The controller 14 performs switching in accordance with an operation thereof. Also, regardless of the operation of the occupant's operation switch 28, for example, the state may be switched to the state in which power is fed to the electrical load 23 on the basis of a vehicle state monitored by the vehicle power supply device 10 at time.

[Operation of Vehicle Power Supply Device]

Hereinafter, an example of the operation of the vehicle power supply device 10 will be described.

Meanwhile, during "load power feeding mode (M9)" the rotational speed of the power generator 21 may quickly increase. For example, if power is fed from the power generator 21 to the electrical load 23 and the capacitor 11 or the battery 12 is not charged, a total amount of the electrical load 23 in response to the power generator 21 quickly decreases. Thereby, if a no-load operation or a light load operation state occurs in the power generator 21, a state in which the rotational speed of the power generator 21 quickly increases may be caused.

On the other hand, for example, when the vehicle power supply device 10 according to the embodiment detects the operation of the operation switch 28 of the occupant and detects the operation for stopping the operation of the electrical load 23, the operation of the electrical load 23 is stopped after the capacitor 11 is charged.

Alternatively, in a state in which the capacitor 11 or the like is charged with power generated by the power generator 21 in "I/S preparation charging (M2)" or "regenerative charging (M3)" and power obtained by power generation of the power generator 21 is supplied to the electrical load 23, the rotational speed of the power generator 21 may quickly increase when both the power supply to the electrical load 23 and the charging of the capacitor 11 or the like are substantially simultaneously stopped.

On the other hand, for example, when the vehicle power supply device 10 according to the embodiment detects the operation of the operation switch 28 of the occupant and detects an operation of stopping the operation of the electrical load 23, a state in which the capacitor 11 is charged continues even after the operation of the electrical load 23 is stopped.

Also, the vehicle power supply device 10 may stop the operation of the electrical load 23 after the capacitor 11 is charged on the basis of the state of the vehicle observed at any time regardless of the operation of the occupant's operation switch 28. Hereinafter, details will be described on the basis of an example in which the operation of the electrical load is stopped on the basis of detection of an operation of the operation switch 28 of the occupant.

In accordance with a result of detecting an operation of the operation switch 28, the controller 14 related to the vehicle power supply device 10 detects switching from the operation state in which the electrical load 23 is operated to the non-operation state when the power generator 21 generates power. The controller 14 charges the capacitor 11 until a predetermined period elapses after the switching to the non-operation state. Also, "when the power generator 21 generates power" in the present application, a time when the controller 14 performs control in a mode such as "I/S preparation charging (M2)," "regenerative charging (M3)," "load power feeding mode (M9)" may be included.

The above-described electrical load 23 may have a relatively large capacity sufficient to affect the rotation of the power generator 21 due to a change in its operation state. For example, an air conditioner, a headlight, or the like for a vehicle are examples of an electrical load 23 which may be a subject for that described above.

For example, the controller 14 may detect an operation indicating the above-described switching before "switching from the operation state in which the electrical load 23 is operated to the non-operation state." Then, the controller 14 charges the capacitor 11 from before switching from the operation state in which the electrical load 23 is operated to the non-operation state in a state in which the power generator 21 generates power.

[Regarding Charging Target Value in Capacitor 11]

As the charging target value TG in the capacitor 11, a predetermined value is determined in correspondence with the state of the capacitor 11 and/or the state of the vehicle. The controller 14 charges the capacitor 11 to the charging target value TG of the capacitor 11. For example, the charging target value TG of the capacitor 11 may be predetermined to be a predetermined value (the charging target value TG1). The charging target value TG1 of the capacitor 11 may be determined to be a value smaller than a value indicating a state when the capacitor 11 is fully charged in accordance with the state of the capacitor 11 and/or the state of the vehicle.

By using the charging target value TG1 of the capacitor 11, the controller 14 may continuously charge the capacitor 11 with power supplied by the power generator if switching from the operation state in which the electrical load 23 is operated to the non-operation state is performed when the power generator generates power.

[Regarding Process of Setting Electrical Load to Non-Operation State]

Figure 2:
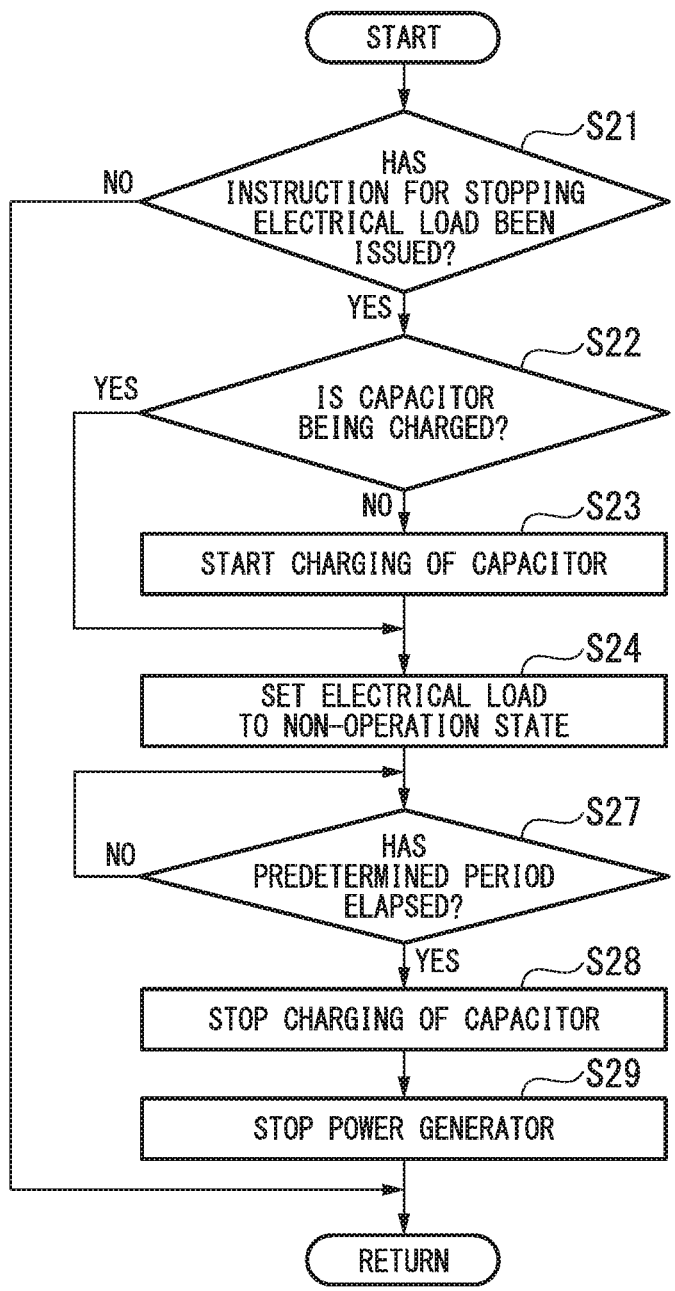
FIG. 2 is a flowchart illustrating a procedure of a process of setting an electrical load to a non-operation state according to the present embodiment.

FIG. 2 is a flowchart illustrating an example of a procedure of a process of setting the electrical load to the non-operation state according to this embodiment.

First, the controller 14 determines whether or not an instruction for stopping the electrical load 23 has been received (S21). If the instruction for stopping the electrical load 23 has not been received, a series of processing steps illustrated in FIG. 2 are completed.

If the instruction for stopping the electrical load 23 has been received, the controller 14 determines whether or not the capacitor 11 is being charged (S22). If the capacitor 11 is being charged, the controller 14 moves the process to step S24.

If the state is not a state in which the capacitor 11 is being charged, the controller 14 starts charging of the capacitor 11 (S23).

Next, if it is determined that the capacitor 11 is being charged in the determination in S22, or when a predetermined time (T12 FIG. 3)) has elapsed from the completion of the processing of S23, the controller 14 sets the electrical load 23 to the non-operation state (S24).

Next, the controller 14 determines whether or not a predetermined period (T23 (FIG. 3)) has elapsed (S27) and, for example, waits until the predetermined period T23 elapses.

Next, after the predetermined period T23 has elapsed, the controller 14 stops charging of the capacitor 11 (S28), stops the power generator 21 (S29), and completes the series of processing steps illustrated in FIG. 2.

[Regarding Process of Setting Electrical Load to Non-Operation State]

Figure 3:
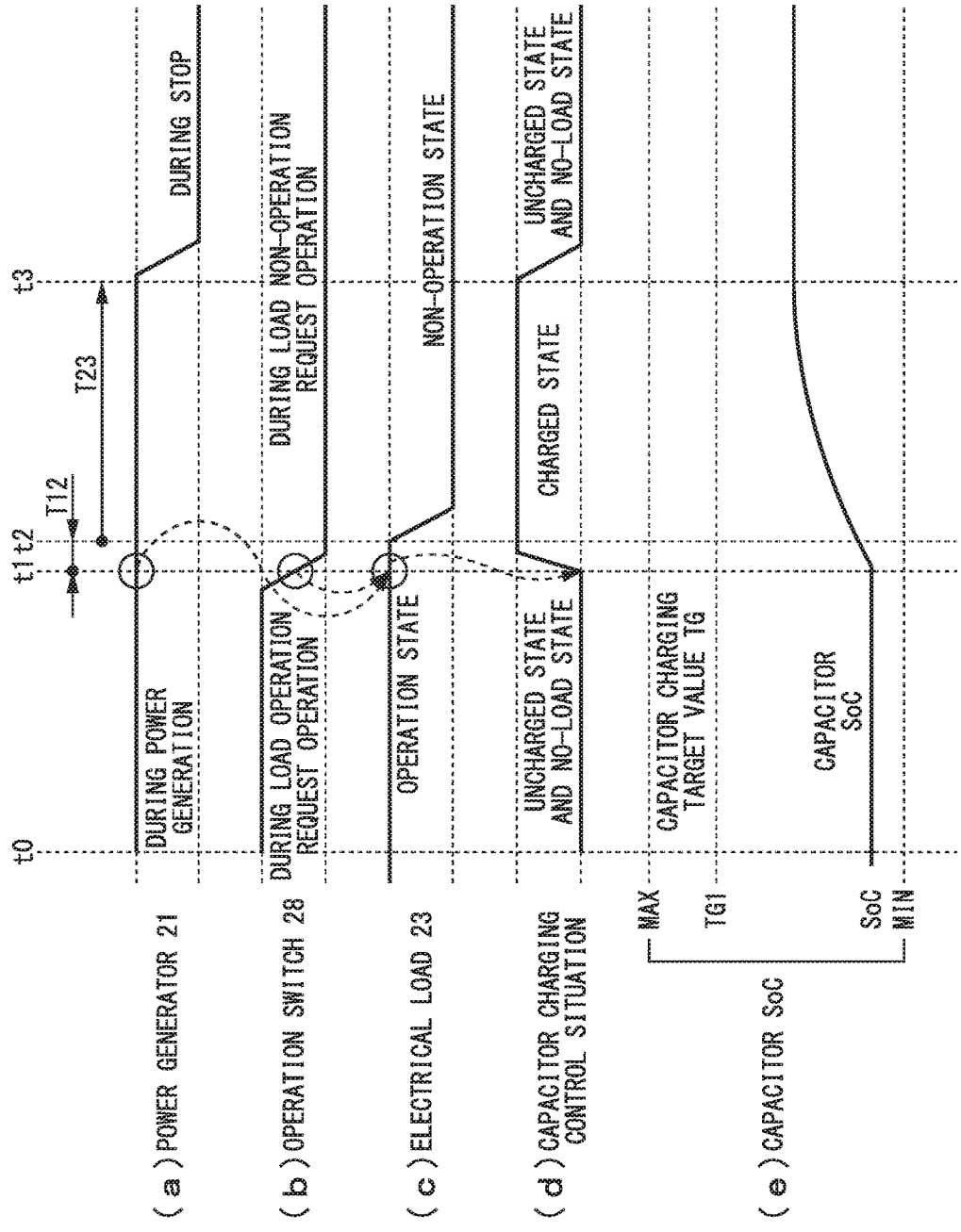
FIG. 3 is a diagram illustrating an example of a process of setting the electrical load to the non-operation state according to the present embodiment.

FIG. 3 is a diagram illustrating an example of a process of setting the electrical load to the non-operation state according to this embodiment. The state of the power generator 21 (during power generation and during stop) is illustrated in FIG. 3(*a*), the state of the operation switch 28 (during a load operation request operation and during a load non-operation request operation) is illustrated in FIG. 3(*b*), the operation state (during an operation and during a non-operation) of the electrical load 23 is illustrated in FIG. 3(*c*), the charging control state (an uncharged state and a charged state) of the capacitor 11 is illustrated in FIG. 3(*d*), and a state of charge (SoC) of the capacitor 11 and the charging target value TG are illustrated in FIG. 3(*e*).

At time t0, the state of the power generator 21 is under the power generation as illustrated in FIG. 3(*a*), the state of the operation switch 28 is under the load operation request operation as illustrated in FIG. 3(*b*), the electrical load 23 is in operation as illustrated in FIG. 3(*c*), the capacitor 11 is in an uncharged state and a no-load state as illustrated in FIG. 3(*d*), and the SoC of the capacitor 11 is in a state of an initial value SC0 as illustrated in FIG. 3(*e*).

Also, the SoC of the capacitor 11 is adjusted between a lower limit value MIN and an upper limit value MAX. For example, the charging target value TG1, which is the control target value, is determined between the lower limit value MIN and the upper limit value MAX.

At time t1, the operation switch 28 is operated as illustrated in FIG. 3(*b*), and the state transitions from a state in which the load operation request operation is in progress to a state in which the load non-operation request operation is in progress. The controller 14 detects the state of each part and detects that the following conditions are satisfied. For example, the controller 14 detects that a condition is satisfied under which there is transition from the state in which the load operation request operation of the operation switch 28 is in progress to the state in which the load non-operation request operation is in progress, the power generator 21 is generating power, the electrical load 23 is in operation and the capacitor 11 is in the uncharged state and the no-load state. When it is detected that the above-described condition is satisfied, the controller 14 starts charging of the capacitor 11 as illustrated in FIG. 3(d). As a result, as shown in FIG. 3(e), the SoC of the capacitor 11 gradually increases from the initial value SC0. At this stage, the total amount of load of the power generator 21 is increased by an amount of power required to charge the capacitor 11.

Further, the controller 14 causes the time measurement unit 29 to start time measurement in synchronization with detection of satisfaction of the above-described condition.

Next, the time measurement unit 29 detects that the predetermined time T12 has elapsed from time t1 and time t2 is reached. The controller 14 receives a notification indicating that the predetermined time T12 has elapsed from the time measurement unit 29, and sets the electrical load 23 in the operation state to the non-operation state.

Next, the time measurement unit 29 detects that the predetermined period T23 has elapsed from time t2 and time t3 is reached. The controller 14 receives a notification indicating that the predetermined period 123 has elapsed from the time measurement unit 29, interrupts the charging of the capacitor 11 in the charged state, and stops the driving of the power generator 21. Thereby, the capacitor 11 is in the non-charged state and in the no-load state, and uses the stored electric power at the next starting time of the internal combustion engine 22. Also, the controller 14 sets the power generator 21 to a stopped state after power for driving the power generator 21 is interrupted.

According to the embodiment, the vehicle power supply device 10 (the power supply control system) includes the power generator 21, the capacitor 11 configured to be charged with power supplied by the power generator 21, and the electrical load 23 configured to be operated with power supplied by the power generator 21. The controller 14 can further improve energy efficiency while suppressing a change in the rotational speed of the power generator 21 capable of being caused when the total amount of the electrical load 23 of the power generator 21 is quickly decreased by charging the capacitor 11 until the predetermined period T23 elapses after switching from the operation state in which the electrical load 23 is operated to the non-operation state when the power generator 21 generates power.

Also, the vehicle power supply device 10 (the power supply control system) charges the capacitor 11 from before time t2 of switching from the operation state in which the electrical load 23 is operated to the non-operation state when the power generator 21 generates power. Thereby, the charging of the capacitor 11 is started from before time t2 of switching from the operation state in which the electrical load 23 is operated to the non-operation state, so that the energy efficiency can be further improved by efficiently charging the capacitor 11 with surplus energy occurring after time t2.

Also, even after the electrical load 23 is switched to the non-operation state, the controller 14 continuously performs charging at the charging target value TO of the capacitor 11 for a predetermined time or more. By maintaining the continuous charging and charging the capacitor 11, the controller 14 can suppress a change in the rotational speed of the power generator 21 after the electrical load 23 is switched to the non-operation state.

Also, the charging target value TG1 is set to a value smaller than the value indicating the state in which the capacitor 11 is fully charged, so that a fully charged state or an overcharged state of the capacitor 11 can be limited even if a change in the rotational speed is made due to a change in a load of the internal combustion engine 22 or the power generator 21.

Also, regardless of whether or not the capacitor 11 has reached the fully charged state, the controller 14 may complete charging of the capacitor 11 or the battery 12 after the predetermined period T23 has elapsed from the start of the charging of the capacitor 11 or the battery 12. Thereby, a change in the rotational speed of the power generator 21 immediately after time t1 can be suppressed, and energy required for suppression can be stored in the capacitor 11 or the battery 12, so that the energy efficiency can be further improved.

Also, the controller 14 charges the capacitor 11 until a predetermined period elapses after switching from the operation state in which the electrical load 23 is operated to the non-operation state in a state in which the operation state of the internal combustion engine 22 (the driving unit) configured to drive the power generator 21 is idling, It is possible to reduce an influence of a change in the electrical load 23 when the operation state of the internal combustion engine 22 is in the idling state.

Also, the controller 14 may set the predetermined period T23 as a period until a value of a charging current to the capacitor 11 detected by a current detecting means (not illustrated) reaches less than a predetermined value.

Further, the controller 14 may set the predetermined period T23 as a period until a time measurement time of the time measurement unit 29 configured to start time measurement after the electrical load 23 is set from the operation state to the non-operation state reaches a predetermined time. In this case, the controller 14 estimates a time required until the charging current for the capacitor 11 is less than predetermined value on the basis of a current SoC (power state) of the capacitor 11. The controller 14 may set the time as the predetermined period. Alternatively, the controller 14 may pre-calculate a time in which the transition from the operation state of the electrical load 23 to the non-operation state can affect an increase in the number of rotations of the internal combustion engine 22 for each operation voltage of the electrical load 23 and set the time as the predetermined period. This time may be predetermined for each operation voltage of the electrical load 23 which transitions from the operating state to the non-operation state. For example, the predetermined period in this case may be a period until the charging current to the capacitor 11 is less than a predetermined value. Also, the value of the predetermined time determined as described above or the data associated therewith may be stored in a storage area (not illustrated) in a table and referred to by the controller 14.

Modified Example of Present Embodiment

Next, a modified example of the present embodiment will be described. In the present embodiment, a case in which the SoC of the capacitor 11 and the charging target value TG1 which is a fixed value are set as control target values has been described.

Instead of this, in this modified example, a case in which the control target value is adjusted will be described. Differences from the present embodiment will be mainly described.

[Regarding Charging Target Value in Capacitor 11]

A predetermined charging target value TG in the capacitor 11 is determined to correspond to a type of the capacitor 11. The controller 14 charges the capacitor 11 for the charging target value TG of the capacitor 11, so that the SoC of the capacitor 11 is adjusted between the lower limit value MIN and the upper limit value MAX.

[Regarding Process of Setting Electrical load to Non-Operation State]

Figure 4:
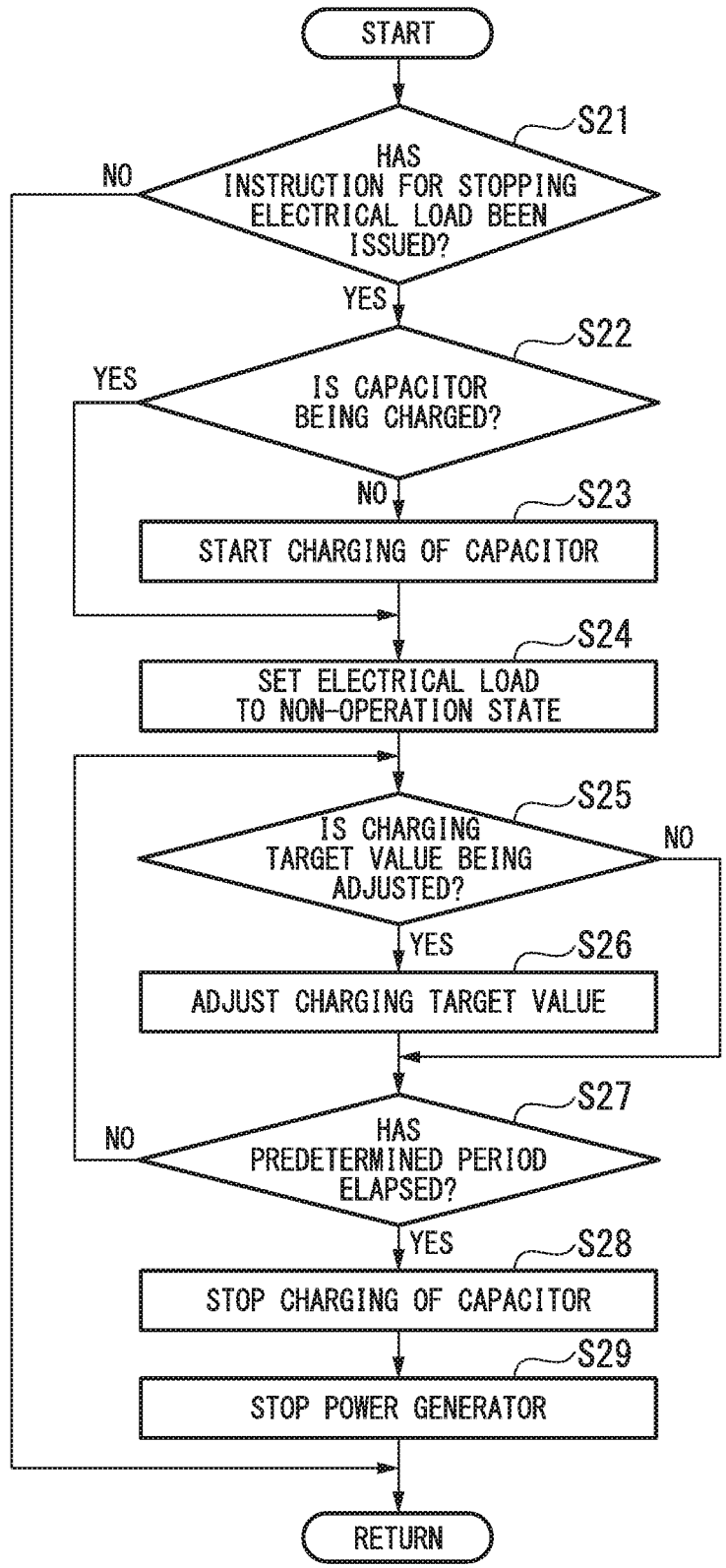
FIG. 4 is a flowchart illustrating a procedure of a process of setting an electrical load to a non-operation state according to a modified example of the present embodiment.

FIG. 4 is a flowchart illustrating a procedure of a process of setting the electrical load to the non-operation state according to a modified example of the present embodiment.

First, the controller 14 determines whether or not an instruction for stopping the electrical load 23 has been received (S21), if the instruction for stopping the electrical load 23 has not been received, a series of processing steps illustrated in FIG. 4 are completed.

If the instruction for stopping the electrical load 23 has been received, the controller 14 determines whether or not the capacitor 11 is being charged (S22). If the capacitor 11 is being charged, the controller 14 moves the process to step S24, If the capacitor 11 is not being charged, the controller 14 starts charging of the capacitor 11 (S23).

Next, if it is determined that the capacitor 11 is being charged in the determination in S22, or when a predetermined time (T12 (FIG. 3)) has elapsed after the completion of the processing of S23, the controller 14 sets the electrical load 23 to the non-operation state (S24).

Next, the controller 14 determines whether or not the charging target value TG is being adjusted (S25). If the charging target value TG is being adjusted, adjustment of the charging target value is sequentially performed (S26).

If the processing of S26 has been completed or if it is determined that the charging target value TG is not being adjusted by the determination in S26, the controller 14 determines whether or not a predetermined period (T23 (FIG. 3)) has elapsed (S27). If the predetermined period T23 has not elapsed, the controller 14 iterates the processing from S26.

If the predetermined period T23 has elapsed, the controller 14 stops charging of the capacitor 11 (S28), stops the power generator 21 (S29), and completes the series of processing steps illustrated in FIG. 4.

[Regarding process of setting electrical load to non-operation state]

Figure 5:
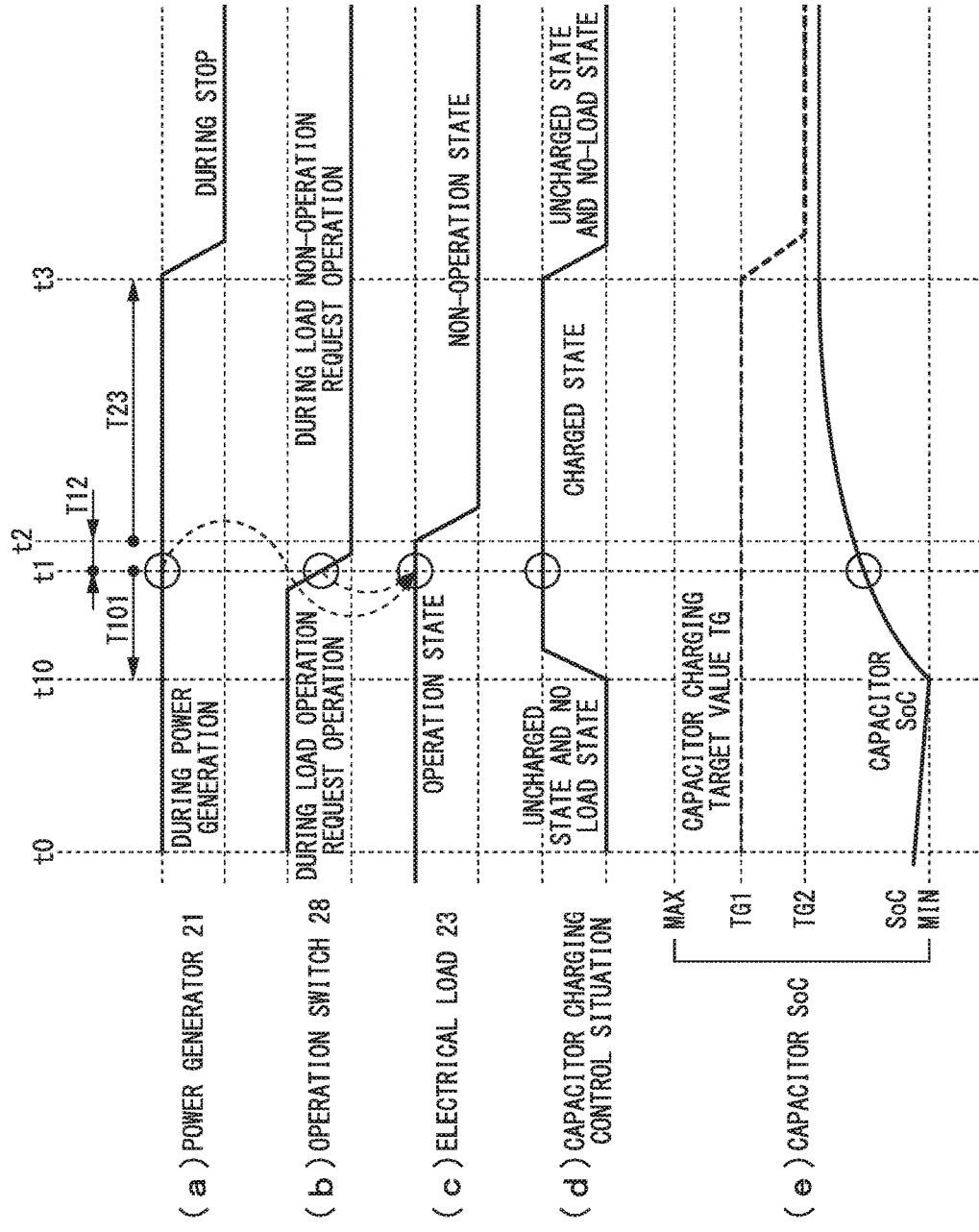
FIG. 5 is a diagram illustrating an example of a process of setting an electrical load to a non-operation state according to a modified example of the present embodiment.

FIG. 5 is a diagram illustrating an example of the process of setting the electrical load to the non-operation state according to the modified example of the present embodiment. FIG. 5 corresponds to FIG. 3 described above.

As illustrated in FIG. 5(e), the charging target value TG1 and the charging target value TG2 are determined between the lower limit value MIN and the upper limit value MAX, and the charging target value TG2 of a value (a second value) smaller than the charging target value TG1 of the capacitor 11 is determined. The controller 14 adjusts the charging target value TG by using the charging target value TG1 and the charging target value TG2. Magnitudes of the charging target values TG1 and TG2 of the capacitor 11 illustrated in FIG. 5, a switching timing, a method of changing the value until switching from the charging target value TG1 to the charging target value TG2, and the like are not limited to those illustrated in FIG. 5, and may be others.

For example, a state of time t0 is similar to that of the above-described embodiment.

Thereafter, at t10, the controller 14 detects that the SoC of the capacitor 11 has decreased to the minimum value MIN, which is the lower limit value of a change range, and starts charging of the capacitor 11. It is assumed that the charging target value TG of the capacitor 11 at that time is the charging target value TG1 (the first value).

At time t1, the operation switch 28 is operated as illustrated in FIG. 3(b), and the state transitions from the state in which the load operation request operation is in progress to the state in which the load non-operation request operation is in progress. The controller 14 detects the slate of each part and detects that the following conditions are satisfied. For example, the controller 14 detects that a condition under which there is transition from a state in which the load operation request operation of the operation switch 28 is in progress to a state in which the load non-operation request operation is in progress, the power generator 21 is generating power, the electrical load 23 is in operation, and the capacitor 11 is in the charged state is satisfied. The controller 14 detects that the above-described condition is satisfied and then switches the electrical load 23 to the non-operation state after time t2.

Thereafter, the controller 14 decreases the charging target value TG from the charging target value TG1 to the charging target value TG2 across a predetermined period. For example, the above-described predetermined period is the time T23 from time t2 to time t3 illustrated in FIG. 5.

The controller 14 may continue charging of the capacitor 11 by the power generator 21 by using the charging target value TG of the capacitor 11 that gradually decreases the value from the charging target value TG1 in a period from time t2 to time t3.

Next, the time measurement unit 29 detects that the predetermined period T23 has elapsed from time t2 and time t3 is reached. The controller 14 receives a notification from the time measurement unit 29 that the predetermined period T23 has elapsed, interrupts the charging of the capacitor 11 in the charged state, and stops driving of the power generator 21. Thereby, the capacitor 11 is in the non-charged state and the no-load state, and holds the stored power. Thereby, the controller 14 can utilize the stored power at the next starting of the internal combustion engine 22. Also, the controller 14 may set the power generator 21 to a stop state by interrupting the power supplied from the internal combustion engine 22 in order to drive the power generator 21.

According to the above-described modified example, in addition to effects similar to those of the present embodiment, the controller 14 charges the capacitor 11 for a predetermined target value (the charging target value TG) related to the state of the capacitor 11 and continuously charges the capacitor 11 with power supplied by the power generator 21 even if switching from the operation state in which the electrical load 23 is operated to the non-operation state is performed when the power generator 21 generates power. Further, when a predetermined time has elapsed from the non-operation state of the electrical load 23, the controller 14 uses the charging target value TG2 (the second value) less than the charging target value TG1 (the first value) used before the electrical load 23 is brought into the non-operation state, Thereby, the capacitor 11 can be efficiently charged.

Also, the controller 14 charges the capacitor 11 for a predetermined target value (the charging target value TG) related to the state of the capacitor 11 and continuously charges the capacitor 11 which is a power supply having high charging/discharging responsiveness among a plurality of power supplies with power supplied by the power generator 21 even if switching from the operation state in which the electrical load 23 is operated to the non-operation state is performed when the power generator 21 generates power. After the predetermined period T23 has elapsed from the non-operation state of the electrical load 23, the controller 14 may be configured to use the charging target value TG2 (the second value) less than the charging target value TG1 (the first value) used before the electrical load 23 is brought into the non-operation state as a target value (the charging target value TG) related to the charging of the capacitor 11 which is the power supply having the high charging/discharging responsiveness among the plurality of power supplies. Thereby, the controller 14 can set the target value (the charging target value) related to the charging of the capacitor 11 to a value less than the charging target value TG1 (the first value) after the predetermined period T23 has elapsed from the non-operation state of the electrical load 23 by continuously charging the capacitor having high charging/discharging responsiveness among the plurality of power supplies with power supplied by the power generator 21.

Also, the controller 14 continuously performs charging for a predetermined time or more at the charging target value TG of the capacitor 11 even after the electrical load 23 is switched to the non-operation state. By maintaining the continuous charging and charging the capacitor 11, the controller 14 can suppress a change in the rotational speed of the power tor 21 after the electrical load 23 is switched to the non-operation state.

Also, after the electrical load 23 is switched to the non-operation state, the controller 14 may reduce the charging target value TG from the charging target value TG1 to the charging target value TG2 across a predetermined time. Thus, when the charging target value TG is changed from the charging target value TG1 to the charging target value TG2, it is possible to continuously adjust the load to be applied to the power generator 21.

According to at least one embodiment as described above, the vehicle power supply device 10 (the power supply control system) includes the power generator 21; the capacitor 11 configured to be charged with power supplied by the power generator 21, the electrical load 23 configured to be operated with the power supplied by the power generator 21; and the controller 14 configured to charge the capacitor 11 until a predetermined period elapses after switching from an operation state in which the electrical load 23 is operated to a non-operation state when the power generator 21 generates the power, thereby further improving energy efficiency.

Although embodiments of the present invention have been described above in detail, specific configurations are not limited to those described above and various changes can be made without departing from the scope of the present invention.

What is claimed is:

1. A power supply control system comprising:
   a power generator;
   a power supply configured to be charged with power supplied by the power generator;
   an electrical load configured to be operated with the power supplied by the power generator; and
   a control unit configured to charge the power supply until a predetermined period elapses after switching from an operation state in which the electrical load is operated to a non-operation state when the power generator generates the power.

2. The power supply control system according to claim 1, wherein the control unit charges the power supply before the switching from the operation state in which the electrical load is operated to the non-operation state when the power generator generates the power.

3. The power supply control system according to claim 2, wherein the control unit charges the power supply to a predetermined target value related to a state of the power supply, continuously charges the power supply with the power supplied by the power generator even in the switching from the operation state in which the electrical load is operated to the non-operation state when the power generator generates the power, and uses a second value less than a first value used before the electrical load is brought into the non-operation state as the target value after the predetermined period has elapsed from the non-operation state of the electrical load.

4. The power supply control system according to claim 3, wherein the control unit performs charging by maintaining the first value as the target value for a predetermined time or more even after switching to the non-operation state.

5. The power supply control system according to claim 3, wherein the control unit decreases the target value from the first value to the second value across the predetermined period after switching to the non-operation state.

6. The power supply control system according to claim 3, wherein the first value is less than a value indicating a state in which the power supply is fully charged.

7. The power supply control system according to claim 1,
   wherein a plurality of power supplies each having different charging/discharging responsiveness are included as the power supply, and
   wherein the control unit charges a power supply having higher charging/discharging responsiveness among the plurality of power supplies until a predetermined period elapses after the switching from the operation state in which the electrical load is operated to the non-operation state when the power generator generates the power.

8. The power supply control system according to claim 7, Wherein the control unit charges the power supply having the higher charging/discharging responsiveness among the plurality of power supplies from before the switching from the operation state in which the electrical load is operated to the non-operation state when the power generator generates the power.

9. The power supply control system according to claim 8, wherein the control unit charges the power supply to a predetermined target value related to a state of the power supply, continuously charges the power supply having the higher charging/discharging responsiveness among the plurality of power supplies with the power supplied by the power generator even in the switching from the operation state in which the electrical load is operated to the non-operation state when the power generator generates the power, and uses a second value less than a first value used before the electrical load is brought into the non-operation state as the target value related to charging of the power supply having the higher charging/discharging responsiveness among the plurality of power supplies after the predetermined period has elapsed from the operation state of the electrical load.

10. The power supply control system according to claim 1, wherein the control unit completes the charging of the power supply after the predetermined period has elapsed.

11. The power supply control system according to claim 1, wherein the control unit completes the charging after the predetermined period has elapsed regardless of whether or not the power supply has reached a fully charged state.

12. The power supply control system according to claim 1, wherein the control unit charges the power supply until the predetermined time elapses after switching from the operation state in which the electrical load is operated to the non-operation state in a state in which a driving state of a driving unit configured to drive the power generator is idling.

13. The power supply control system according to claim 1, wherein the power supply has higher charging/discharging responsiveness than a lead storage battery.

14. The power supply control system according to claim 1, wherein the predetermined period is a period during which an electrical current for charging the power supply is less than a predetermined value.

15. A power supply control method in a power supply control system including a power generator, a power supply configured to be charged with power supplied by the power generator, and an electrical load configured to be operated with the power supplied by the power generator, the power supply control method comprising:

charging the power supply until a predetermined period elapses after switching from an operation state in which the electrical load is operated to a non-operation state when the power generator generates the power.

* * * * *